United States Patent [19]

Thatcher

[11] Patent Number: 4,952,459

[45] Date of Patent: Aug. 28, 1990

[54] GLASS SHEET AND LAMINATE AT ONE SIDE THEREOF

[76] Inventor: Jesse D. Thatcher, 931 Bennett St., Simi Valley, Calif. 93065

[21] Appl. No.: 245,503

[22] Filed: Sep. 19, 1988

[51] Int. Cl.$^5$ .................. B32B 17/10; B32B 17/08
[52] U.S. Cl. ......................... 428/426; 428/40; 428/212; 428/214; 428/216; 428/332; 428/336; 428/343; 428/354; 428/441; 428/442; 428/480; 428/483
[58] Field of Search ............... 428/426, 441, 442, 212, 428/213, 214, 216, 40, 343, 354, 355, 480, 483, 332, 336

[56] References Cited

U.S. PATENT DOCUMENTS

| | | | |
|---|---|---|---|
| Re. 29,663 | 6/1978 | Theissen | 428/353 |
| 3,170,833 | 2/1961 | Noyes | 428/416 |
| 3,290,203 | 12/1966 | Antonson | 161/4 |
| 3,681,179 | 7/1970 | Theissen | 428/336 |
| 3,775,226 | 11/1973 | Windorf | 428/354 |
| 3,900,644 | 8/1975 | Sackoff et al. | 428/458 |
| 3,900,662 | 8/1975 | Yuan | 428/252 |
| 4,028,475 | 6/1977 | Willdorf | 428/215 |
| 4,157,417 | 6/1979 | Murphy | 428/429 |
| 4,226,910 | 10/1980 | Dahlen et al. | 428/480 |
| 4,242,403 | 12/1980 | Mattimoe | 428/213 |
| 4,309,484 | 1/1982 | Ohmae | 428/441 |
| 4,329,396 | 5/1982 | Kropp | 428/458 |
| 4,353,766 | 10/1982 | Dani | 428/480 |
| 4,355,080 | 10/1982 | Zannucci | 428/483 |
| 4,382,996 | 5/1983 | Mori | 428/442 |
| 4,427,743 | 1/1984 | Katsuki | 428/424.6 |
| 4,456,639 | 6/1984 | Drower | 428/13 |
| 4,467,023 | 8/1984 | Creasy | 525/127 |
| 4,474,856 | 10/1984 | Meyer | 428/426 |
| 4,551,388 | 11/1985 | Schlademan | 428/355 |
| 4,600,627 | 7/1986 | Honda | 428/203 |
| 4,634,637 | 1/1987 | Oliver et al. | 428/480 |
| 4,668,574 | 5/1987 | Bolton | 428/339 |
| 4,737,548 | 4/1988 | Kojima | 525/193 |

Primary Examiner—Ellis P. Robinson
Assistant Examiner—Archene A. Turner
Attorney, Agent, or Firm—William W. Haefliger

[57] ABSTRACT

A visual quality, laminated glass structure is produced by an in-line lamination procedure. The laminated construction is achieved through the application of an optical grade double faced adhesive coated film to the monolithic glass sheet and the subsequent lamination of a flexible web film to the adhesive coated monolithic glass. The resultant construction is a monolithic product consisting of a sheet glass, a primary acrylic bonding agent, a clear polyester carrier, a secondary acrylic bonding adhesive and outer layer of polyester film. The laminated glass structure has enhanced structural qualities and performance characteristics.

12 Claims, 2 Drawing Sheets

GLASS SHEET AND LAMINATE AT ONE SIDE THEREOF

BACKGROUND OF THE INVENTION

1. Field of Invention.

This invention is in the field of laminated glass and in particular it relates to coated glass sheets where it is desirable to improve structural characteristics through the addition of adhesive or adhesives and a flexible, thin plastic film or films. Flexible thin film systems can be specially surface pretreated to achieve substantially enhanced or improved performance characteristics when laminated to monolithic glass. Specific applications include the shatterproofing of glass, the addition of unique solar control performance characteristics to glass, the addition of electrical static dissipation characteristics to glass, the creation of an antifogging monolithic glass material, etc.

2. Prior Art.

In the past, lamination of glass has been accomplished by mating two sheets of glass using either some form of catalyzed bonding agent, or by placing a piece of polyvinyl butyral (PVB) between two pieces of glass and subjecting the construction to a combination of heat and pressure which liquifies the PVB material, thereby bonding the two sheets of glass into a single laminated structure. These forms of laminations have been utilized principally with glass for the primary purpose of creating a safety glazing material. While solar control or other properties can be incorporated into these glass structures by using sheet goods which have been specially surface coated, such combinations are expensive and limited in their variations by virtue of the expense and difficulty associated with treating and metallizing rigid sheet glass.

Retrofit film systems have been introduced for application to existing windows, and these films are applied to a wide variety of glass which is already in-place. These film systems utilize a pressure sensitive adhesive which has been factory applied to the film. Such film constructions have traditionally been used for the purpose of solar control and the shatterproofing of the glazed glass.

Also known is the so-called antilacerative windshield. This laminated glass system consists of two pieces of glass combined through the use of polyvinyl butryal, with the inner side of the glass treated with a secondary antilacertative flexible film. The flexible polyester film consisted of a PET film laminated to a second flexible sheet of PVB which in turn was formed to the glass and then placed under heat and pressure causing the secondary or antilacerative film to both bond and conform to the contours of the windshield.

Traditional laminated glass forming techniques seek principally to use thinner sheets of glass to make a thicker, safer monolithic material which sometimes possesses additional unique properties such as solar load reduction, heat retention, sound reduction, etc. Additionally, usage of thinner glass to create thicker structures often results in a more brittle glass combination ultimately causing high incidents of glass failure. Solar control films, as described above, can be applied in a factory setting by using a pretreated PSA adhesive coated flexible film. The visual quality of the lamination is limited by the quality of the pressure sensitive application made by the film supplier. Additionally, small particulate on the glass cannot be absorbed by a thin, fully cured pressure sensitive film system, thereby forming so-called tents or bubbles. Antilacerative structures as described above are currently used to provide additional safety and may offer in the future enhanced performance characteristics for glass.

BRIEF SUMMARY OF THE INVENTION

The lamination assembly of the present invention provides efficient, economical, monolithic sheet material, while creating a visually acceptable, laminated structure. By applying a high mass double-faced pressure sensitive adhesive system, small residual particulate can be encapsulated into the adhesive mass thus eliminating the appearance of the "tenting effect". Furthermore, while applying the flexible web film systems, additional performance values can be incorporated into the new laminated sheet construction by utilizing a flexible plastic web film which has been pretreated with a specialty coating or coatings. The application of a double-faced pressure sensitive adhesive with an internal carrier, and the addition of a flexible web thin film to glass, will cause the glass to respond to impact in the same manner as PVB laminated glass. However, the present laminated structure also features both an inner and an exterior film which act as catchers preventing glass from flying or spalling into the room side or "housed" side, of a structure such as a building. The multilayers of polyester film and acrylic pressure sensitive adhesives provide the coated monolithic glass structure with additional strength, as the laminated structure absorbs significantly more impact than retrofit safety film, for example, through the principle of sequential impact absorption dilution allowing for superior break resistance and glass shard retention.

Where required, further enhancements can be added to the new laminated structure. This can be accomplished by adding a secondary coating or lamination to the second uncoated surface of the previously coated sheet glass. Thus, the second or #2 surface of the monolithic glass sheet can be laminated using the same process as described herein.

Accordingly, it is a major object of the invention to provide a glass and laminate composite comprising:
(a) a glass sheet, and
(b) a laminate at one side only of the sheet including
  (i) a first, solid, layer of synthetic polyester material,
  (ii) a first adhesive layer bonding said layer to one side of the sheet,
(c) the remaining side of the sheet being free any laminate adherent thereto.

As will appear, the glass may consist of tempered glass; the laminate may be transparent; and the laminate may include
  (i) a second, solid, layer of synthetic polyester material, and
  (ii) a second adhesive layer bonding said second polyester layer to said first layer.

Further, the layers typically consist of polyester film, and the adhesive layer typically consists of clear acrylic pressure sensitive adhesive.

It is a further object of the invention to provide a method of forming a glass and laminate composite, the method steps including:
(a) providing a primary laminate that comprises a first, solid, layer of synthetic polyester material, a first adhesive layer at one side of said first polyester layer, a second adhesive layer at the opposite side of said first polyester layer, and first and second protective release layers covering said adhesive layers, respectively, (b) progressively stripping the first protective release layer off the first adhesive layer and progressively adhering the thus exposed first adhesive layer onto a side of the glass sheet, (c) progressively stripping the second progressive release layer off the second adhesive layer to expose same, (d) providing a second synthetic polyester layer and progressively adhering said second polyester layer to the exposed second adhesive layer.

As referred to, polyester layers are typically provided as films, the second (outer) such layer characterized as one of the following:

(1) shatter resistant
(ii) anti-fogging
(iii) electrically conductive
(iv) solar radiation, detecting and/or absorbing Typically, and more specifically, the flat glass sheet is advanced edgewise between first nip rolls, and the primary laminate off which the first release layer has been stripped is also advanced endwise between the nip rolls which operate to effectively pressurize the exposed first adhesive layer against a side of the glass sheet; also, the glass sheet and the laminate off which both release layers have been stripped are advanced endwise between second nip rolls, which operate to effectively pressurize the exposed second polyester layer against the second exposed adhesive layer.

The principles and features introduced above, and their advantages, may be more fully understood from the detailed disclosure hereunder, with reference to the accompanying drawings.

DETAILED DESCRIPTION

Figure 1:
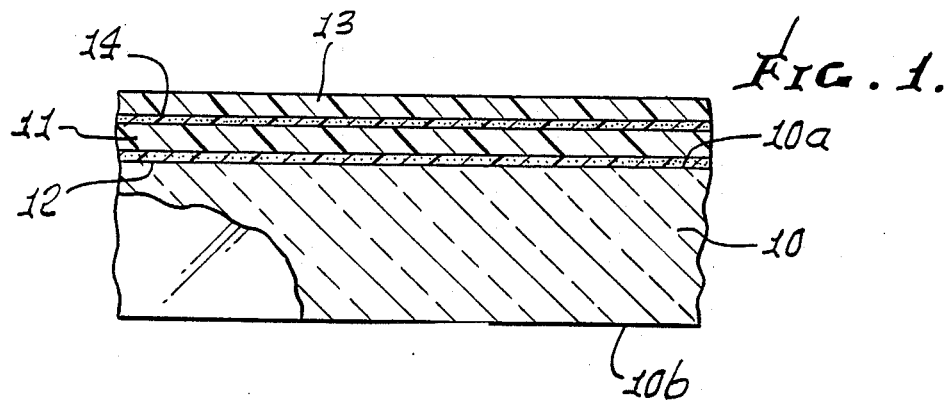
FIG. 1 is an edge elevation, in section, showing the form of the invention.

In FIG. 1, a glass and laminate composite includes a glass sheet 10 having upper and lower flat parallel surfaces 10a and 10b; and a laminate at only one side of the glass sheet including a first, solid, layer 11 (i.e. film) of synthetic polyester, and a first adhesive layer 12 bonding layer 11 to the glass sheet side 10a. The remaining side 10b of the glass sheet is free of any laminate adherent to same. As illustrated, the laminate also includes a second, solid, layer 13 (i.e. film) of synthetic polyester, and a second adhesive layer 14 bonding layer 13 to layer 11. The polyester layers 11 and 13 for example consist of polyethylene teriphthalate; and the adhesive layers 12 and 14 consists of acrylic, as for example permanent high temperature, pressure sensitive acrylic. An example is the product "FLEXMOUNT" DFM 100C V95/150/V95/150, produced by Flexcon of Spencer, Mass. All of the layers 11–14 are typically transparent, and the glass may consist of tempered glass.

Thicknesses of the glass and other layers are as follows:

|    | Range                | Preferred  |
|----|----------------------|------------|
| 10 | .1 inch to 1.0 inch  | —          |
| 11 | .0005 inch to .002 inch | .001 inch |
| 12 | .0004 inch to .0015 inch | .0008 inch |
| 13 | .001 inch to .010 inch |           |
| 14 | .0004 inch to .0015 inch | .0008 inch |

Figure 2:
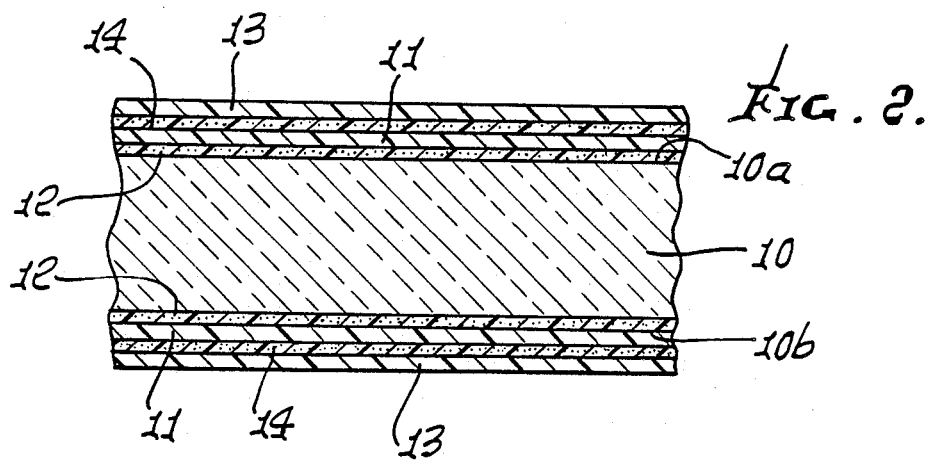
FIG. 2 is an edge elevation, in section, showing another form of the invention.

FIG. 2 is like FIG. 1, but adds the same laminate to the opposite side of the glass sheet.

Figure 3:
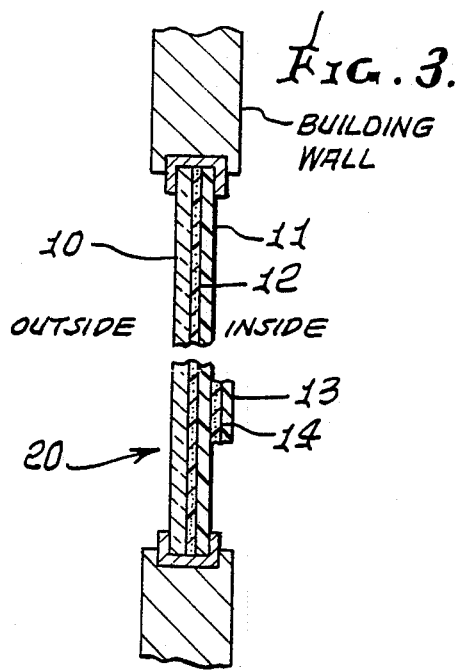
FIG. 3 and 4 are elevation, in section, showing uses of the invention.
Figure 4:
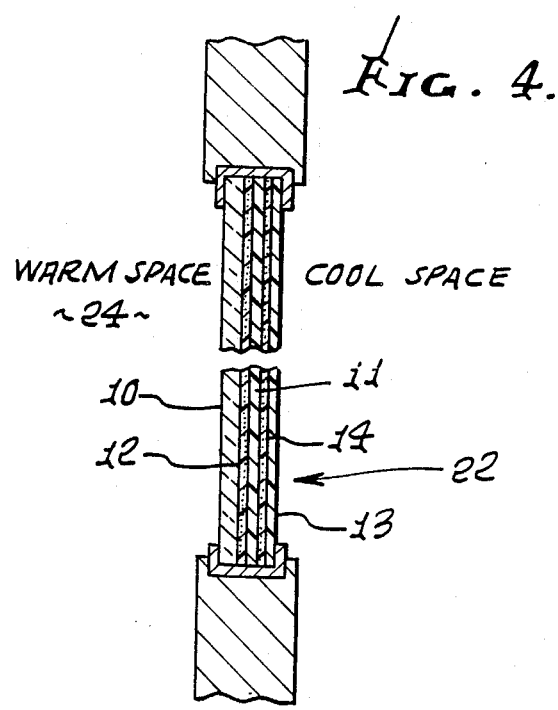

FIG. 3 shows the FIG. 1 composite installed as a window 20 in a building, the polyester layer or layers being at the inside of the window, to "catch" glass fragments in case of glass fracture (as for example by impact from an external object). Layers 11 and 12 are shown on glass 10; and layers 13 and 14 may be included to define an assembly as in FIG. 1. In FIG. 4, the assembly of FIG. 1 is used as a door 22 between a cold space 23 and a warm or warmer space 24. If the door is opened, the laminate 11–14 prevents fogging as by moisture condensation on layer 14. And, the surface of layer 14 may be treated (i.e. single side coated film utilizing a two-part urethane coating, as described in U.S. Pat. No. 4,467,073) for anti-fogging, as by use of the commercial film product "VISTEX", a product of Film Specialties, Inc. Whitehouse, N.J. Alternatively, the surface is given shatterproof, anti-spalling properties, as a result of the one side lamination as in FIG. 1. Alternatively, the pretreated film may be given electrically conductive properties, by use of the sputter coated film product "ALTAIR", a product of Southwall Technologies, Palo Alto, Calif. For solar control properties, the pretreated film may be a sputter coated and polyester known as "LLUMAR-N-SERIES", a product of Martin Processing, Martinsville, Va.

Figure 5:
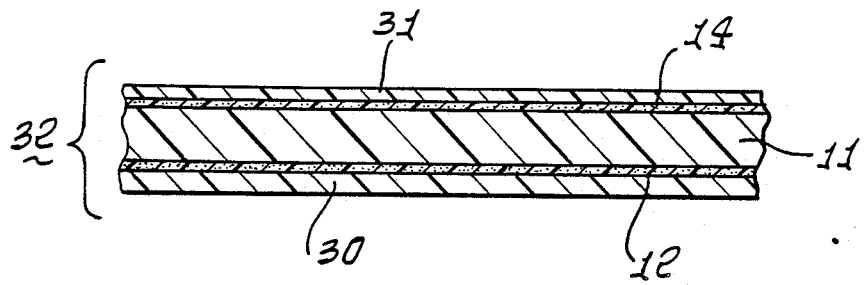
FIG. 5 is an edge elevation showing a composite used in the method to produce the laminate of FIG. 1.
Figure 7:
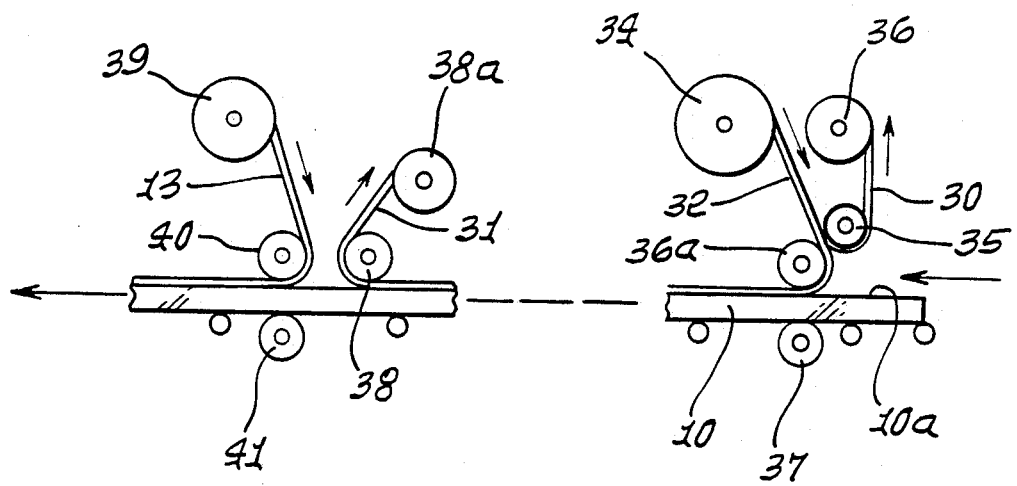
FIG. 7 is an elevation showing the method of producing the laminate of FIG. 1, using the composite of FIG. 5 and the film of FIG. 6.

The method of forming the FIG. 1 glass and laminate composite, employing a glass sheet, includes providing a primary laminate that comprises a first, solid, layer of synthetic polyester material, a first adhesive layer at one side of said first polyester layer, a second adhesive layer at the opposite side of said first polyester layer, and first and second protective release layers covering said adhesive layers, respectively. See for example the laminate of FIG. 5 which includes the first polyester film 11, the first adhesive layer 12, the second adhesive layer 14, and the first and second release layers or films 30 and 31. These typically consist of silicone polyester. The entire laminate 32 may comprise the product known as FLEXMOUNT DFM-100C V95/150/V95/150, a product of Flexcon Company, Inc. Spencer, Mass. The first protective release layer 30 is stripped off the first adhesive layer, as shown in FIG. 7, as by unreeling a length of the laminate 32 off roll 34, and stripping off layer 30 around roll 35, and back to a reel 36. The remainder of the laminate 32 is passed about an upper nip roller 36 so that the now exposed adhesive layer 12 is progressively adhered to the upper surface 10a of glass sheet 10 passed endwise between the upper nip roll 36 and lower nip roll 37. The spacings of these rolls is such as to press the adhesive layer 12 downwardly onto surfce 10a, to effect the progressive bonding.

Figure 6:
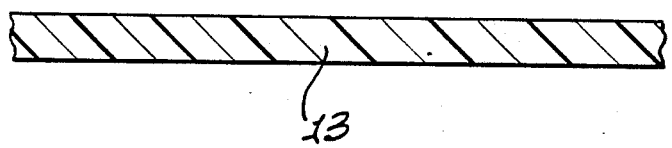
FIG. 6 is an edge elevation showing a polyester film used in the method to produce the laminate of FIG. 1.

The second protective layer 31 is then progressively stripped off the adhesive layer 14, as by turning it about a roll 38 and winding about roll 38a, as the glass sheet passes leftwardly in FIG. 7. Finally, the second synthetic polyester layer or film 13 seen in FIG. 6 is provided as on a reel 39, and unreeled to pass about an upper nip roll 40 and progressively onto the now exposed adhesive layer 14. The applied pressure of the layer 13 onto adhesive layer 14 is controlled by the upper and lower nip rolls 40 and 41, to receive or effect good bonding of layer 13 to layer 14. Desirably, the process is carried out in a cleanroom or controlled environment.

I claim:

1. In a glass and laminate composite, the combination comprising:
   (a) a glass sheet, and
   (b) a laminate at one side only of the sheet including
      (i) a first, solid, layer of synthetic polyester material,
      (ii) a first adhesive layer bonding said layer to one side of the sheet,
   (c) the remaining side of the sheet being free of any laminate adherent thereto,
   (d) the laminate including
      (i) a second, solid, layer of synthetic polyester material, and
      (ii) a second adhesive layer bonding said second polyester layer to said first layer.
   (e) each adhesive layer consisting of pressure sensitive, synthetic resinous adhesive.

2. The combination of claim 1 wherein said glass sheet consists of tempered glass.

3. The combination of claim 1 wherein said laminate is transparent.

4. The combination of claim 1 wherein said first layer is a polyester film.

5. The combination of claim 1 wherein each of said layers consists of polyester film.

6. In a glass and laminate composite, the combination comprising:
   (a) a glass sheet, and
   (b) a laminate at one side only of the sheet including
      (i) a first, solid, layer of synthetic polyester material,
      (ii) a first adhesive layer bonding said layer to one side of the sheet,
   (c) the remaining side of the sheet being free of any laminate adherent thereto,
   (d) the laminate including
      (i) a second, solid, layer of synthetic polyester material, and
      (ii) a second adhesive layer bonding said second polyester layer to said first layer
   (e) each adhesive layer consisting of acrylic pressure sensitive adhesive.

7. The combination of claim 1 wherein said second polyester layer is characterized as shatter resistant and also one of the following:
   (i) anti-fogging
   (ii) electrically conductive
   (iii) solar radiation reflecting
   (iv) solar radiation absorbing.

8. The combination of claim 1 wherein said glass and laminate composite defines a window installed in a building, the laminate being at the building interior side of the glass and said second polyester layer being shatter resistant.

9. In a glass and laminate composite, the combination comprising:
   (a) a glass sheet, and
   (b) a laminate at one side only of the sheet including
      (i) a first, solid, layer of synthetic polyester material,
      (ii) a first adhesive layer bonding said layer to one side of the sheet,
   (c) the remaining side of the sheet being free of any laminate adherent thereto,
   (d) the laminate including
      (i) a second, solid, layer of synthetic polyester material, and
      (ii) a second adhesive layer bonding said second polyester layer to said first layer,
   (e) said glass and laminate composite defining a window separating two spaces, one of which is substantially cooler than the other, the second polyester facing said cooler space and characterized as anti-fogging.

10. The combination of claim 1 wherein the thickness of the second polyester layer substantially exceeds the thickness of the first polyester layer.

11. The combination of claim 10 wherein the thickness of the first polyester layer ranges from 0.0005 inch to 0.002 inch, and the thickness of the second polyester layer ranges from 0.001 inch to 0.010 inch.

12. In a glass and laminate composite, the combination comprising:
   (a) a glass sheet, and
   (b) a laminate at one side only of the sheet including
      (i) a first, solid, layer of synthetic polyester material,
      (ii) a first adhesive layer bonding said layer to one side of the sheet,
   (c) the remaining side of the sheet being free of any laminate adherent thereto,
   (d) the laminate including
      (i) a second, solid, layer of synthetic polyester material, and
      (ii) a second adhesive layer bonding said second polyester layer to said first layer,
   (e) the thickness of the second polyester layer substantially exceeding the thickness of the first polyester layer,
   (f) the thickness of the first polyester layer ranges from 0.0005 inch to 0.002 inch, and the thickness of the second polyester layer ranges from 0.001 inch to 0.010 inch.
   (g) the thickness of each adhesive layer ranging from 0.0004 to 0.0015 inch, each adhesive layer consisting of acrylic.

* * * * *